United States Patent [19]
Caldwell

[11] Patent Number: 5,560,388
[45] Date of Patent: Oct. 1, 1996

[54] SEAL PLUG FOR LINED PIPELINES

[76] Inventor: Thomas M. Caldwell, 2758 Tennesse Walker Way, Paso Robles, Calif. 93446

[21] Appl. No.: 276,888

[22] Filed: Jul. 18, 1994

[51] Int. Cl.$^6$ .......................... F16K 43/00; F16L 55/132
[52] U.S. Cl. .............. 137/15; 137/318; 138/89; 138/94
[58] Field of Search .............. 137/15, 315, 318; 138/89, 94, 94.3, 97; 285/210

[56] References Cited

U.S. PATENT DOCUMENTS

| | | | |
|---|---|---|---|
| 223,327 | 1/1880 | Farrington | 285/210 |
| 330,502 | 11/1885 | McFarland | 285/210 |
| 531,425 | 12/1894 | Porteous | 285/210 |
| 567,115 | 9/1896 | Atkinson et al. | 285/210 |
| 610,308 | 9/1898 | Seaman et al. | 411/65 |
| 621,108 | 3/1899 | Leonard | 285/210 |
| 757,641 | 4/1904 | Saunders | 285/210 |
| 1,043,230 | 11/1912 | Henderson | 285/210 |
| 1,850,040 | 3/1932 | Turner | 138/94 |
| 1,913,222 | 6/1933 | Von Glahn | 285/210 |
| 1,997,878 | 4/1935 | Wagner | 138/89 |
| 2,170,866 | 8/1939 | McAllister | 138/94 |
| 2,299,814 | 10/1942 | Gale et al. | 137/320 |
| 2,872,963 | 2/1959 | Boyer | 152/427 |
| 2,911,859 | 11/1959 | Longley et al. | 137/318 |
| 3,275,023 | 9/1966 | Raspante | 137/315 |
| 3,473,555 | 10/1969 | Martin et al. | 137/315 |
| 3,716,257 | 2/1973 | Hackman et al. | 285/210 |
| 3,756,261 | 9/1973 | Minchhoff | 137/318 |
| 3,981,061 | 9/1976 | Jackson | 29/157 |
| 4,029,118 | 6/1977 | Merideth | 137/318 |
| 4,184,504 | 1/1980 | Carmichael et al. | 137/318 |
| 4,293,259 | 10/1981 | Liebig | 411/32 |
| 4,503,879 | 3/1985 | Lazarus | 138/94 |
| 5,088,153 | 2/1992 | Winder et al. | 16/108 |
| 5,197,567 | 3/1993 | Rabalais | 184/15 |
| 5,199,145 | 4/1993 | McMillan | 29/237 |
| 5,293,259 | 10/1981 | Liebig | 411/32 |
| 5,345,964 | 9/1994 | Friedel | 137/318 |

FOREIGN PATENT DOCUMENTS

| | | |
|---|---|---|
| 5-248585 | 9/1993 | Japan . |
| 5-272684 | 10/1993 | Japan . |
| 2217801 | 1/1989 | United Kingdom . |

*Primary Examiner*—George L. Walton
*Attorney, Agent, or Firm*—Fulwider Patton Lee & Utecht, LLP

[57] ABSTRACT

A seal plug and installation tool for providing fluid access to a fluid distribution pipeline having an internal liner affixed therein and a bore hole formed therethrough. The seal plug includes a body having an enlarged diameter head and an elongated stem, the stem and head having a fluid transmission passage therethrough. An expandable anchoring member is axially movable on the stem having an unexpanded diameter less than the diameter of the bore hole so that the anchoring member may be passed therethrough and thereafter expanded to a diameter larger that the pipeline bore hole. The installation tool is removeably attached to the pipeline and is releasably engageable to seal plug, and is used to insert the seal plug within the pipeline. The tool then draws the expanded anchoring member towards to the head to securely connect the seal plug to the pipeline and liner. A sealant is positioned at the junction of the pipeline, liner, and seal plug.

14 Claims, 8 Drawing Sheets

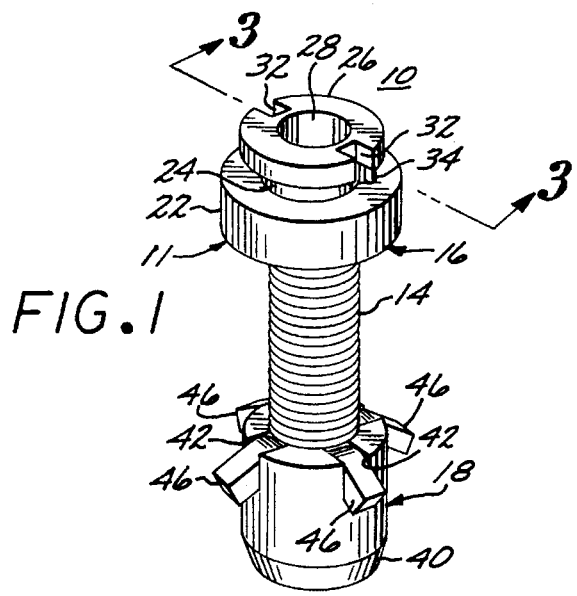
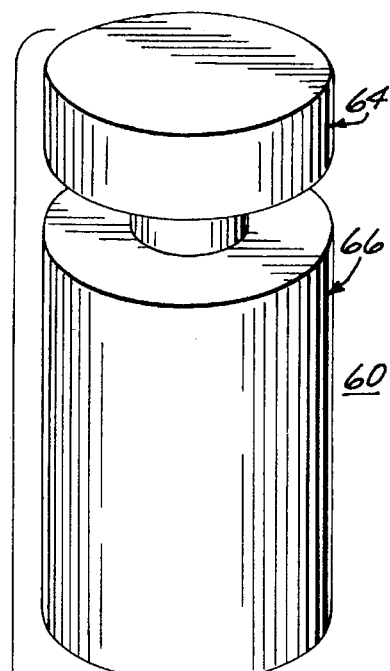
FIG. 1
FIG. 3
FIG. 2

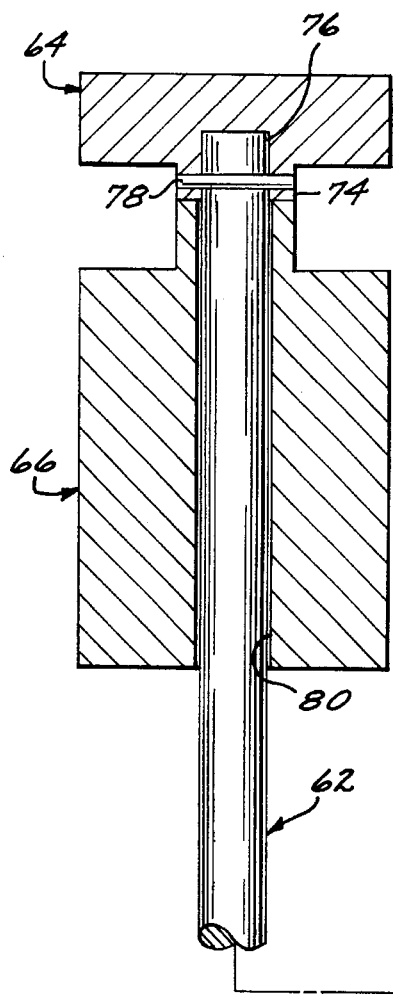
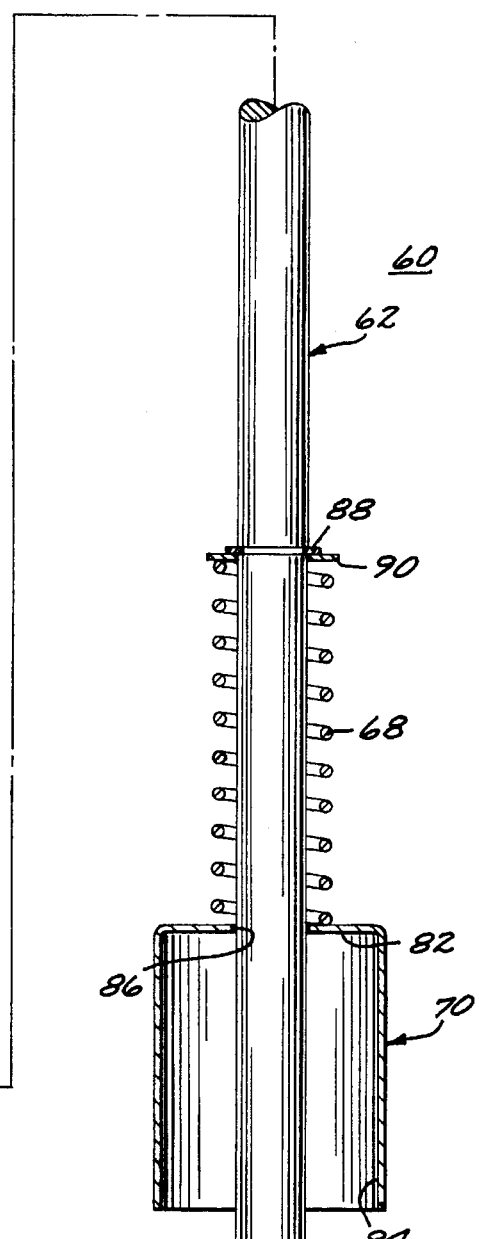
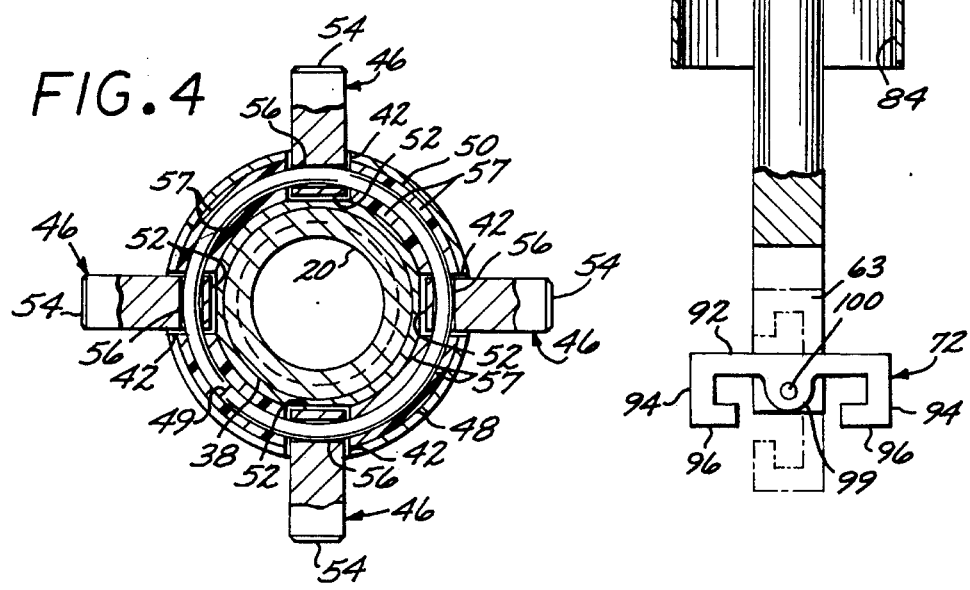

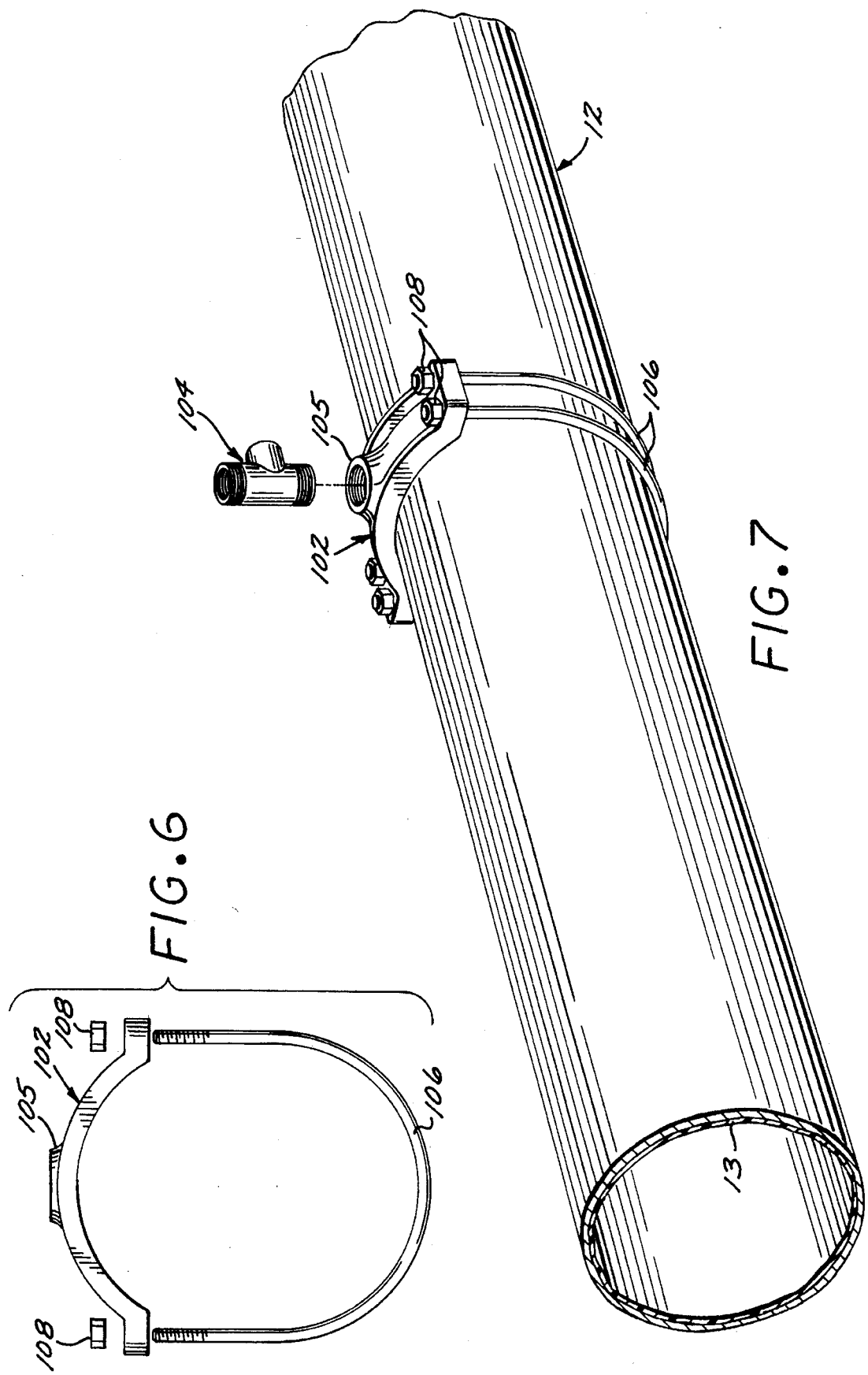

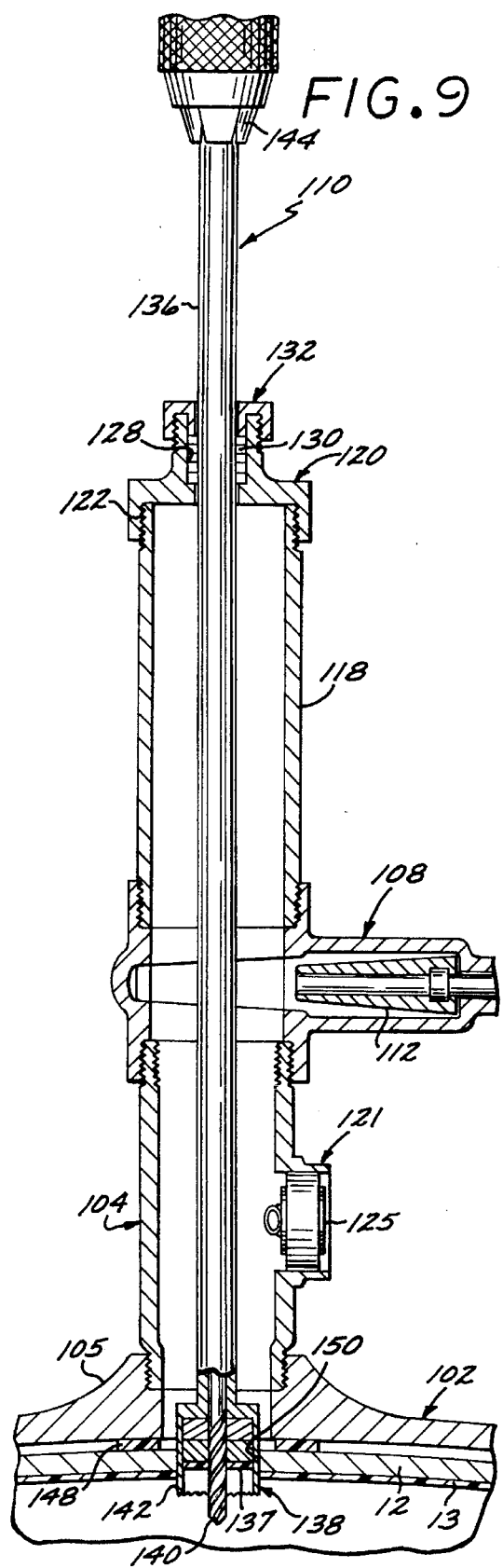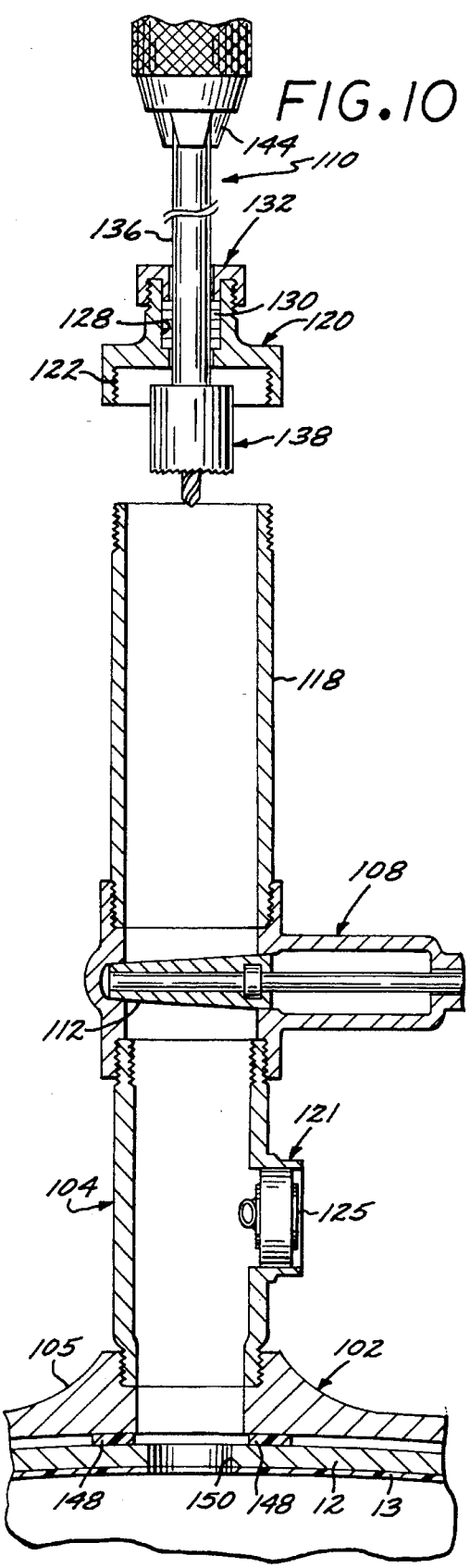

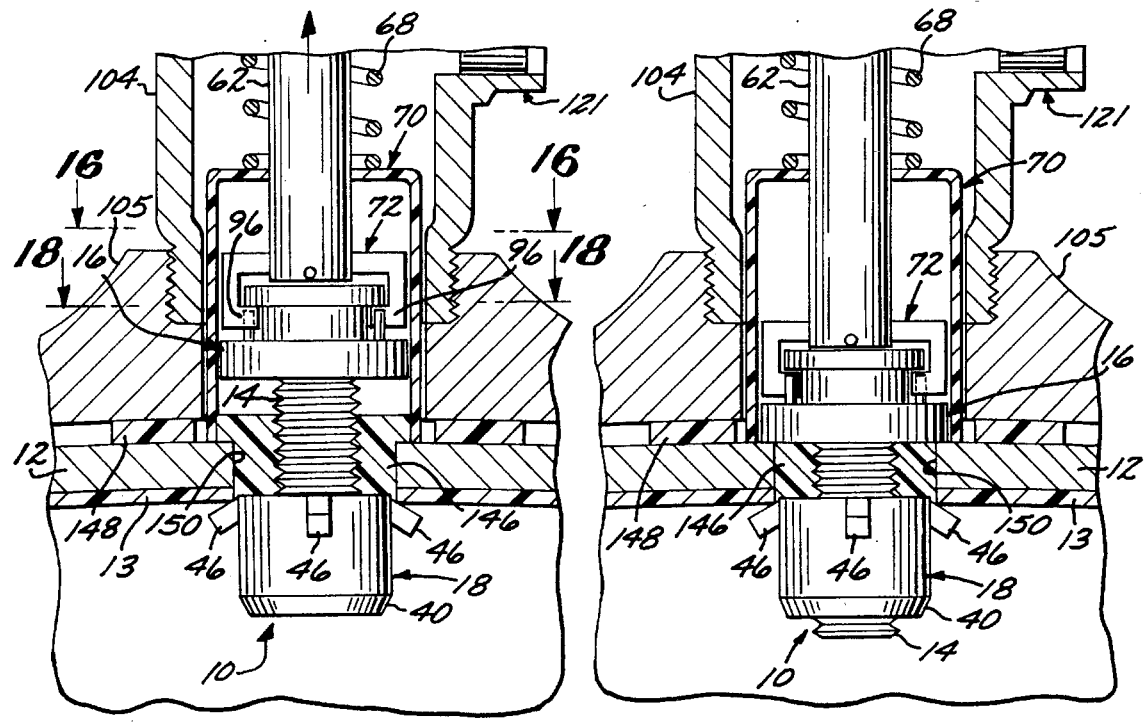
FIG.14  FIG.15
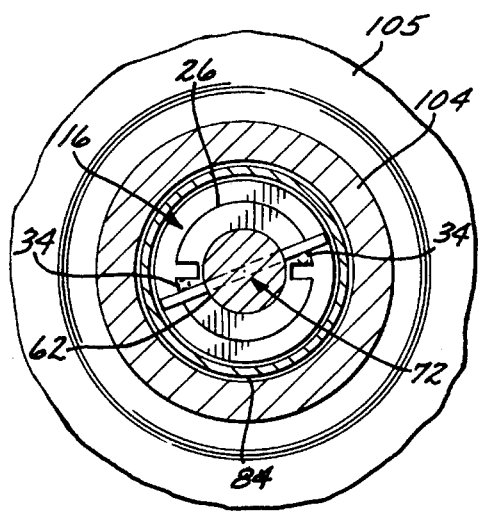
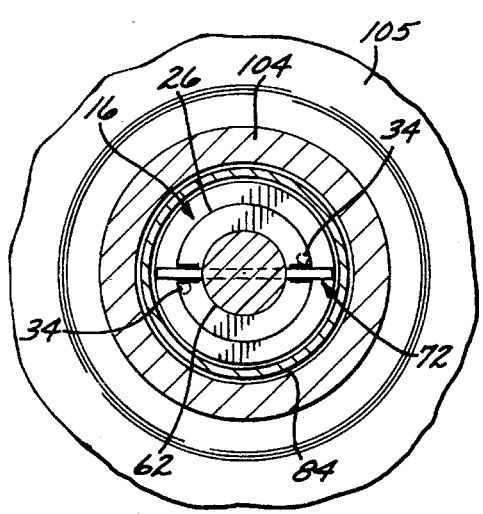
FIG.16  FIG.17

5,560,388

1

SEAL PLUG FOR LINED PIPELINES

BACKGROUND OF THE INVENTION

The present invention relates to a device for accessing fluid distribution pipelines, and particularly to a sealable coupling to affect such access.

Modern utilities have broadly adopted the use of inner pipeline liners to refurbish and rehabilitate low and medium pressure underground pipelines used for sewer, gas, and water distribution. The installation of such liners may be performed without pipeline excavation and can stop leaks and prevent future leakage. Rehabilitation of old pipelines to new pipeline specifications can save many thousands and perhaps millions of dollars in pipeline replacement costs. In addition, because the liner is installed without trenching and excavation, many environmental and municipal regulations may be circumvented which can save in regulatory permitting costs and in some circumstances litigation expense. Furthermore, in eliminating the necessity for excavation, surface obstructions or hazards otherwise associated with open trenches are eliminated.

Pipeline liners of this type are generally formed as an elongated collapsible elastomeric cylindrical tube impregnated with a polyester woven fabric. During installation, a continuous length of liner is selected, the diameter thereof conforming to the inside diameter of the pipeline and the length thereof corresponding to the length of pipeline to be fitted. The liner, in its collapsed state, is inserted into manholes or access junctions and drawn through the length of pipeline to be refurbished. Once the collapsed liner has been fully introduced into the pipeline, the liner is thereafter expanded to conform to the inner diameter of the pipeline. The outer surface of the liner is usually provided with an adhesive so that when the liner is expanded, the liner bonds to the inner pipeline surface. The adhesive is allowed to dry and the pipeline thereafter reintroduced into service.

Typically when it is subsequently desired to couple to such a lined pipeline, for instance to provide service to new residential communities, an access pit is excavated around a length of pipeline at a selected intermediate location along the length thereof. Thereafter, the pipeline may be taken out of service, evacuated of pressurized fluid, and a hole is bored or drilled into the pipeline and through the liner. On the outer surface of the pipeline, a sealing gasket is placed about the periphery of the bore hole and an appropriate saddle connector, or the like, having a fluid bore therethrough is fitted around the pipeline to complete the coupling. Although, conventional saddle connectors of this sort have proven effective for effectuating fluid access to distribution pipelines, they do not provide a means for sealing the internal liner relative to the pipeline.

It is imperative that the integrity of the adhesive bond between the liner and pipeline around the bored hole be maintained. Should the liner become separated from the pipeline at the bore hole, the integrity of the refurbished pipeline and effectiveness of the liner may be destroyed. Therefore, it is desirable that the point of penetration into the pipeline and around the coupling be effectively sealed to maintain or improve the integrity of the bond between the liner and the pipeline.

In similar fields of endeavor, others have developed devices for coupling or teeing into fluid reservoirs. A coupling device of this nature is disclosed in U.S. Pat. No. 567,115 to Atkinson et. al. In general, the coupling disclosed in the patent is for connecting to a water closet having a fluid

2 ejectment hole in the sidewall thereof for receipt of a coupling stem or short section having an axial bore therethrough. One end of the stem includes threads on the external surface for connection to piping. The other end of the coupling stem has pivoted therefrom a plurality of longitudinally projecting fingers each having outwardly projecting hooks extending from the respective distal ends thereof. The fingers are pivoted inwardly during installation so that when the coupling stem is introduced into the water closet ejectment hole, the hooks pass therethrough. Once the stem is disposed within the ejectment hole, a wedge device having a fluid bore therein is inserted into the axial bore of the stem and advanced therethrough, the bottom edge of the wedge pivoting the ends of the fingers outwardly so that the hooks may engage the periphery of the bore hole. An annular gasket and bolt thereafter are placed over the stem and the bolt threadedly advanced over the stem until the gasket and reservoir wall are compressed between the hooks and the bolt, the gasket facilitating a fluid seal. Devices as this have proven effective in use however, the gasket seal arrangement such as this does not seal the annular volume between the stem and the bore hole.

Another coupling device is disclosed in U.S. Pat. No. 3,981,061 to Jackson et. al. The coupling device has a stem section, one end thereof having a pair of rigidly formed oppositely and outwardly projecting legs. A heel-and-toe manipulating action is required to insert the legs into a pipeline bore hole. The rigid legs engage the inner peripheral portion of the pipeline bore hole when a bolt or the like is tightened down upon outwardly projecting opposite end of the stem. Although this type of device allows for the flowing of a pliable sealant into the annulus between the stem and bore hole, the rigid configuration of the legs and heel-and-toe manipulation of the coupling may prove difficult when installing in a confined area.

Hence, those skilled in the art have recognized the need for a coupling device to access a fluid distribution pipeline having a liner disposed therein, and more particularly to a coupling device which allows for flowing of a sealant into the open volume between the coupling device and a bore hole formed in the pipeline and liner. It is also desirable for such a coupling device to have the ability for installation into pressurized pipelines. In addition, the coupling device should be easy to install, reliable in use, and inexpensive to manufacture. The present invention meets these needs and others.

SUMMARY OF THE INVENTION

The present invention is directed to a pipeline seal plug for accessing a fluid distribution pipeline having a pipeline liner affixed to the inner diameter thereof and an access bore formed in the side wall of such pipeline and liner. The seal plug is received within the fluid access bore and an adhesive sealant is introduced around the seal plug to seal the bond line between the pipeline and liner.

Briefly and in general terms, the pipeline seal plug includes a stem having an enlarged head, the stem and head formed with a fluid passage bore therethrough. The seal plug further includes a anchoring member engaged to the stem, an expansion device expandable about the anchoring member, and a means for introducing the adhesive sealant into the open volume between the stem and pipeline bore hole when the seal plug is disposed therein.

During installation of the seal plug, the anchoring member is directed into the pipeline bore hole. When the anchoring member has passed through the pipeline bore hole, the expansion device is expanded. The anchoring member is thereafter progressively engaged on the stem whereby the expansion device blocks retraction of the anchoring member from the pipeline bore hole, so that the expansion device and the enlarged head of the stem compressively bear against the inner liner and pipeline wall to secure the seal plug thereto.

In a more detailed aspect, the expansion device of the anchoring member includes a plurality of dogs that pivot radially outwardly when the anchoring member has passed through the pipeline bore hole. The plurality of dogs block retraction of the anchoring member from the pipeline bore hole as the anchoring member is progressively engaged on the stem during installation.

The pipeline seal plug may be installed with an installation tool that releasably engages the enlarged head of the stem and includes the means for introducing the adhesive sealant into the open volume between the stem and pipeline bore hole. The tool may be used to progressively engage the anchoring member onto the stem and relative to the enlarged head. As the anchoring member is progressively engaged onto the stem, a volume of the adhesive sealant is uniformly introduced into the open volume between the stem of the seal plug and the pipeline bore hole. In a more detailed aspect, the means for introducing the adhesive sealant includes an adhesive reservoir positioned on the installation tool, the reservoir carrying an adhesive sealant therein.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of a pipeline seal plug in accordance with the invention;

FIG. 2 is a perspective view of a pipeline seal plug installation tool;

FIG. 3 is an enlarged sectional side view of the pipeline seal plug taken along line 3—3 of FIG. 1;

FIG. 4 is a transverse sectional view of the pipeline seal plug taken along line 4—4 of FIG. 3;

FIG. 5 is a partial sectional side view of the installation tool shown in FIG. 2;

FIG. 6 is a side view of a saddle for use in conjunction with the pipeline seal plug of the invention;

FIG. 7 is perspective view of a pipeline mounting a saddle such as that shown in FIG. 6;

FIG. 9 is a partial sectional side view of the apparatus illustrated in FIG. 8, but showing the sidewall of the pipeline having a hole being bored therein;

FIG. 10 is a partial sectional side view of the apparatus illustrated in FIG. 9, and showing a finished bore hole in the sidewall of the pipeline;

FIG. 14 is a partial sectional side view of the pipeline seal plug and installation tool similar to that illustrated in FIG. 13, but showing the seal plug being partially withdrawn from the bore hole in accordance with the invention so that the expansion means of the seal plug engages the inner periphery of the pipeline bore hole;

FIG. 15 is a partial sectional side view of the pipeline seal plug and installation tool similar to that illustrated in FIG. 14, but showing the seal plug tightened down about the pipeline bore hole;

FIG. 16 is a transverse sectional top view of the pipeline seal plug and installation tool taken along line 16—16 of FIG. 14, and showing a drive tang of the installation tool in "tightening" engagement with the seal plug;

FIG. 17 is a transverse sectional top view, similar to FIG. 16, but showing the lateral opposite ends of the drive tang of the installation tool in alignment with slots formed in the pipeline seal plug;

DETAILED DESCRIPTION OF THE PREFERRED EMBODIMENT

Figure 8:
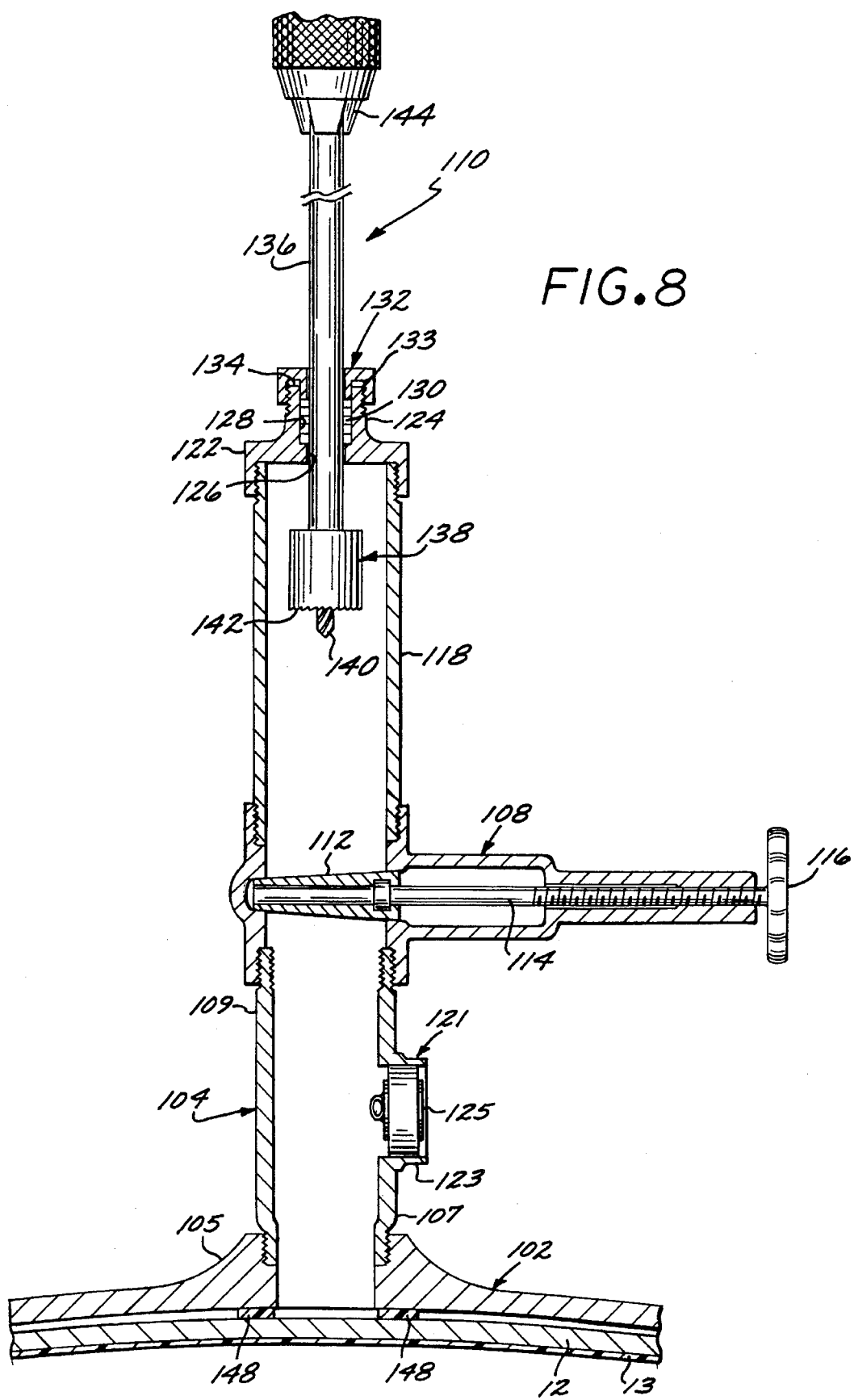
FIG. 8 is a partial sectional view of an apparatus for boring a hole through the sidewall of a pipeline.

As shown in the drawings for purposes of illustration, the invention is embodied in a pipeline seal plug 10 for coupling to an fluid distribution pipeline 12, the pipeline having an internal liner 13 disposed therein. As discussed below, the seal plug may be installed into a pressurized or non-pressurized fluid distribution pipe, such as a large diameter gas distribution pipeline, using a seal plug installation tool 60.

With the cost conscious environment of today's business, the advent of lining predisposed underground fluid distribution piping systems has been accepted by municipalities as a cost effective means for rehabilitating old and deteriorating pipelines to new specifications. To rehabilitate an old pipeline, a collapsible tubular elastomeric liner is received within an evacuated length of pipe, the liner thereafter expanded to conform to the inner diameter of the pipeline whereby a suitable adhesive is used to fixedly secure the lining to the inner surface of the pipeline, the adhesive connection therebetween defining a bond line.

Once the liner has been installed and the pipeline reintroduced into service, subsequent coupling or "teeing" into the pipeline may be desired. The pipeline penetration point and a fitting used to affect such coupling must be appropriately sealed to prevent leakage around the installed coupling. In particular, pipelines having an internal liner should be sealed at the bond line between the liner and pipeline wall to prevent separation of the liner from the pipeline wall near the pipeline penetration point which may defeat the integrity of the refurbished pipeline.

Referring to FIGS. 1 and 3, briefly and in general terms, the seal plug 10 includes body 11 comprising a stem 14, a head taking the form of top cap nut 16, and a radially extendible anchoring member taking the form of a bottom dog nut 18. The stem 14 is externally threaded over the entire length thereof and the stem and top cap nut 16 are formed with a smooth axial through bore 20 for passage of fluid therethrough.

The top cap nut 16 is generally cylindrical having an enlarged diameter lower portion 22, a reduced-in-diameter circumferential groove 24, and an enlarged diameter head 26. The top of the cap nut has an axial cap nut bore 28 formed therethrough of substantially the same diameter as the stem bore 20. The lower end 30 of the cap nut bore is threaded for threaded receipt of the top end of the stem 14. The cap nut head 26 includes a pair of oppositely aligned radial slots 32 therein, the inward extent of such slots substantially conforming to the inner diameter of the groove 24.

Figure 20:
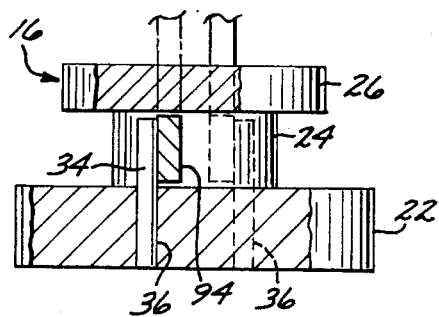
FIG. 20 is a sectional side view of the top portion of the pipeline seal plug taken along line 20—20 of FIG. 18.

As shown in FIG. 20, a pair of small diameter pins 34 (only one pin shown in FIGS. 1 and 3) are pressed through respective pin bores 36 formed in the lower portion 22 of the cap nut 16. The pin bores are parallel to the central axis of cap nut and formed radially opposite of one another. The pins are pressed through the pin bores so that the pins traverse the slot 24 and are interposed between the head and lower portion. The pins are located adjacent the respective slots 32 in a counter-clockwise direction taken from the top view (see FIG. 18).

Returning to FIGS. 1 and 3, the bottom dog nut 18 is generally cylindrical and formed with an axial threaded dog nut bore 38 therethrough, the bore being substantially the same diameter as the threaded stem 14 for threaded receipt thereof. The bottom of the dog nut has downwardly converging frustoconical taper 40 which assists in positioning the dog nut into a pipeline bore hole when installed, as will be discussed below.

With reference to FIG. 4, a plurality of dog slots 42 are formed radially inwardly from the circumference of the dog nut 18 and are equidistantly spaced apart from each other around the top portion of the dog nut. With particular reference to FIG. 3, the dog slots extend downwardly a selected longitudinal distance, the outer bottom edge thereof defining respective abutment surfaces 44. Disposed within each of the respective dog slots are respective dogs 46 pivoted radial outwardly therefrom, about a split dog retaining ring 48 being split at one point 49 about its circumference. The split ring is disposed within an annular groove 50 formed downwardly from the top end of the dog nut (FIG. 4). In the preferred embodiment shown, four dog slots carrying four respective dogs are utilized, however more or less may be found suitable in use.

Each of the dogs 46 is formed as an elongated member, square or rectangular in cross section, having first and second ends 52 and 54 respectively, wherein the first end is radiused about a pivot pin bore 56 (FIG. 4) transverse to the longitudinal axis of the dog.

Referring to FIG. 4, when assembling the bottom dog nut 18 and preparing the dogs 46 for receipt within the dog slots 42, the dog retaining ring 48, being composed of resilient spring steel in the preferred embodiment, is separated at the split 49 and received within the respective pivot pin bores 56 of the respective dogs. The resilient retaining ring returns to its closed state to retain the dogs thereon, the dogs being free to slide on the ring. As such, the dogs are thereafter aligned with the respective dog slots 42 and the dog retaining ring is disposed within the annular groove 50 so that the first end 52 of the dogs are received within the dog slots. Thereafter, a hardening resin or epoxy is introduced into the annular groove and the epoxy allowed to cure, the epoxy securely retaining the ring 48 in the groove while allowing the dogs to freely pivot radially upwardly about the ring and within the dog slots.

With reference to FIGS. 2 and 5, the seal plug installation tool 60 used for installing the pipeline seal plug 10 can be described in detail. Briefly and in general terms, the installation tool 60 includes a vertical shaft 62, a lock handle 64, a slide handle 66, a compression spring 68, a sealant reservoir 70, and a drive tang 72.

With particular reference to FIG. 5, the lock handle 64 is generally cylindrical body having a reduced-in-diameter neck 74 and an axial bore 76 formed upwardly from the bottom of the neck and terminating within the lock handle body. The top end of the shaft 62 is received within the lock handle bore 76 and a transverse pin 78 is pressed through the neck 74 and top end of the shaft to fixedly secure the lock handle thereto.

The slide handle 66 is generally a cylindrical body having an axial slide handle bore 80 therethrough and a reduced-in-diameter top end. The slide handle bore is slightly larger in diameter than the shaft 62 so that the slide handle may be slidably telescoped thereover.

The sealant reservoir 70 is formed as an inverted open cup having upper wall 82 and downwardly extending cylindrical side walls 84. An aperture 86 is formed through the axial center of the upper wall and is of a diameter slightly larger than the outer diameter of the shaft 62 so that the reservoir may slide axially thereover.

Intermedially formed along the periphery of the shaft is a groove (not shown) that receives a spring retaining ring 88 therein. Disposed over the shaft 62 and under the ring is an enlarged diameter spring retaining washer 90.

With particular reference to FIG. 2, interposed between the upper wall 82 of the sealant reservoir 70 and the washer 90 is the helical compression spring 68 slidably disposed over the shaft 62. The spring is shown compressed upwardly and the sealant reservoir raised upwardly therewith to expose the bottom end of shaft for purposes of illustration.

The elongated shaft 62 is formed at the bottom end thereof with a transverse drive tang slot 63. The slot is formed across the major diameter of the shaft and receives the drive tang 72. The drive tang 72 is generally C-shaped having an elongated backing member 92, the lateral opposite ends thereof having downwardly projecting side members 94. Each of the respective side members has respective inwardly projecting and opposing inward members 96. Downwardly projecting from the center of the backing member is a radiused projection 99 having a tang pin bore 100 formed through the geometric center of the drive tang (FIG. 5). The drive tang is positioned in the bottom end slot 63 of the shaft 62 and a tang slot pin is pressed transverse to the slot and is slidably disposed through the tang pin bore so that the tang may freely pivot relative to and within the bottom end slot. It is to be appreciated that the outer (major) dimension of the respective side members 94 are substantially the same diametric dimension as the shaft 62. The dimension of the side members 94 has been selected so that when the drive tang is pivoted vertically, the drive tang passes within the dimension of the shaft, as shown in phantom in FIG. 5, the significance thereof described below.

Referring to FIGS. 6 and 7, the pipeline seal plug 10 is adapted for use with a conventional type saddle, generally indicated at 102, and a "tee" fitting 104. The saddle is formed as a curved body, the inner radial dimension sized to conform to the outer dimension of the pipeline 12. The saddle has a centrally disposed internally threaded saddle neck 105 for receipt of the threaded tee. As shown in FIG. 7, a pair of U-bolts 106 straddle the pipeline circumference, the threaded ends thereof passed through respective bolt holes at opposite ends of the saddle and the saddle tightened down over the pipeline with nuts 108. An appropriate saddle of this type may be provided by Tyco-Grinnell-Muller Co. of Decatur, Ill. It is to be appreciated that, in certain applications, the end of one arm of the tee fitting 104 may be formed with an inwardly radiused weld surface conforming to the outer radius of the pipeline and directly welded to the surface of the pipeline 12, eliminating the necessity for a saddle.

With reference now to FIGS. 8, 9 and 10, the pipeline coupling procedure can be described in more detail. To provide fluid access into a pipeline, a bore hole must be bored into the sidewall of the pipeline 12. To bore the bore hole into a pressurized pipeline, threaded "tee" fitting 104, a conventional gate valve 108, and a boring apparatus 110 are utilized. A tee fitting and gate valve may be provided by Tyco-Grinnell-Muller Co. of Decatur, Ill., however, other types of devices may be employed.

With particular reference to FIG. 8, the bottom arm 107 of the tee fitting 104 is threadedly engaged to the saddle neck 105. The top end of the arm is threaded both internally and externally, the internal threads provided for receipt of a plug 152 (FIG. 21), as will be described below. The leg 121 of the "tee" fitting 104 is formed with a welding neck 123 for subsequent weldment to a metallic pipe. The leg of the "tee" includes a removable rubber expansion plug 125 which is compressively fitted in the orifice of the neck to provide a fluid tight seal during installation of the seal plug 10.

Threadedly engaged to the top arm 109 of the tee fitting 104 is the gate valve 108. The gate valve is of the conventional type having a gate 112 rotatably attached to a valve stem 114, the opposite end thereof having a valve stem handle 116 for opening and closing the valve. Threadedly engaged to the top side of the gate valve is an extension pipe or work bonnet 118, the opposite end thereof threadedly engaged to a service cap, generally indicated 120.

The service cap 120 provides a sealing means between the boring apparatus 110, the pressurized pipeline 12, and the atmosphere. The service cap has a bottom cap portion 122 and a projecting neck 124, the bottom cap portion being internally threaded at the bottom end for threaded receipt of the work bonnet 118. The cap portion and neck are formed with an axial service cap bore 126 formed therethrough for receipt of a drill shank 136 of the boring apparatus 110. The axial service cap bore has an increased-in-diameter portion 128, the top end of the neck being threaded externally. Packing material 130 formed as an elongated ring and is thereafter disposed within the increased-in-diameter portion 128. A packing cap 132 having an internally threaded portion 133 and a concentric inner projecting boss 134 is threaded onto the neck so that the boss engages the packing material 30 and compresses the packing material radially inwardly against the shank 136 of the boring apparatus to provide an effective rotary seal therebetween.

The boring apparatus 110 includes an elongated shank 136, mounting on the bottom end thereof a conventional hole saw 138. The hole saw has an axial pilot bit 140 concentrically disposed within an open cylindrical saw member 142. A heavy duty industrial drill having a conventional drill chuck 144 is releasably engaged to the shank of the boring apparatus.

To couple the seal plug 10 to a pressurized gas distribution pipeline 12, the saddle 102 is secured around the pipeline (FIG. 7), and over a gasket 148 disposed around the penetration point. Thereafter, the bottom leg 107 of the tee fitting 104 is threadedly engaged to the saddle neck 105. The gate valve 108 is threaded to the tee fitting and the work bonnet 118 is threaded onto the gate valve.

As such, the service cap 120 may be threaded to the top end of the work bonnet 118 so that the hole saw 138 is downwardly received within the work bonnet, as depicted in FIG. 8. The drill chuck 144 may now be tightened down to engage the top end of the drill shank 136. The gate valve 108 may be opened and the hole saw 138 and shank 136 advanced downwardly through the work bonnet 118 and the gate valve 108 until the pilot bit 140 of the hole saw contacts the outer surface of the pipeline 12.

As shown in FIG. 9, the drill is actuated so that the hole saw 138 bores through the pipeline 12 and lining 13 to form a bore hole 150. As the pipeline is penetrated, pressurized pipeline fluid leaks through to the bore hole to pressurize the internal volume of the tee fitting 104, valve orifice, and work bonnet 118. The packing material 130 of the service cap 120 seals the service cap 120 and drill shank 136 to prevent pressurized fluid from escaping to atmosphere. As shown, the bored material or "plug" 137 is retained in the cylindrical volume of the hole saw member 142 for subsequent withdrawal.

Thereafter, the hole saw 138 and shank 136 are pulled upwardly so that the hole saw is passed through the tee fitting 104 and the orifice of the gate valve 108. The hole saw is parked within the work bonnet 118 and the gate valve subsequently closed. The boring apparatus 10 is now in a position similar to that illustrated in FIG. 8, however the bore hole 150 is now formed in the sidewall of the pipeline 12.

With the gate valve 108 closed, the service cap 120 may be threadedly disengaged from the top end of the work bonnet 118, as shown in FIG. 10. The pressurized fluid contained in the volume of the work bonnet is slowly released to atmosphere, the gate valve providing a seal so that further fluid leakage and pressure is not passed to atmosphere. Thereafter, the boring apparatus 110 may be removed from the work bonnet.

With reference now to FIGS. 1, 3, 5, 18 and 19, to effectuate the installation of the pipeline seal plug 10 to the pipeline 12, releasable engagement of the adhesive reservoir 70 and seal plug 10 to the installation tool 60 is performed and will be described hereafter in detail.

It is to be appreciated that the adhesive reservoir 70 is disposable. As such, the removal of a used reservoir from the installation tool 60 and installation of a new reservoir onto the tool may be required at various pipeline seal plug installation sites. With reference to FIG. 5, to remove a used reservoir, the reservoir 70 is pulled upwardly relative to the shaft 62, compressing the spring 68 to expose the drive tang 72. With the reservoir in this position, the drive tang may be turned to its vertical position, as shown in phantom. As described above, the dimension of the side members 94 is selected so that the drive tang may pass within the outer dimension of the shaft 62. As such, the reservoir may be slid downwardly relative to the shaft and over the drive tang and removed from the installation tool. To install a new reservoir onto the shaft of the tool, the reservoir is held in its downward inverted position as shown, and the reservoir and the orifice 86 thereof slid upwardly and over the drive tang and the bottom of the tool shaft. The bottom wall 82 of the reservoir engages the bottom of the spring, compressing the spring upwardly. The drive tang may thereafter be pivoted laterally relative to the shaft. The reservoir may be released so that the spring carries the reservoir downwardly so that the backing member 92 of the drive tang engages the bottom wall 82 of the reservoir to block movement of the reservoir off of the shaft while retaining the reservoir thereon.

Prior to installation, as shown in FIGS. 1 and 3, the pipeline seal plug 10 would be disengaged from the installation tool. To engage the seal plug to the tool for installation, a workman pulls the adhesive reservoir 70 upwardly relative to the shaft 62 to expose the bottom of the shaft and the drive tang 72. With the drive tang in its laterally extending rotated position, as shown in FIG. 2, the head 26 of the cap nut 16 is positioned under the drive tang for engagement thereto. The inward projections 96 of the tang are aligned with the slots 32 of the head 26 and the seal plug raised relative to the tool 60 so that the projections pass through the slots 32.

Figure 11:
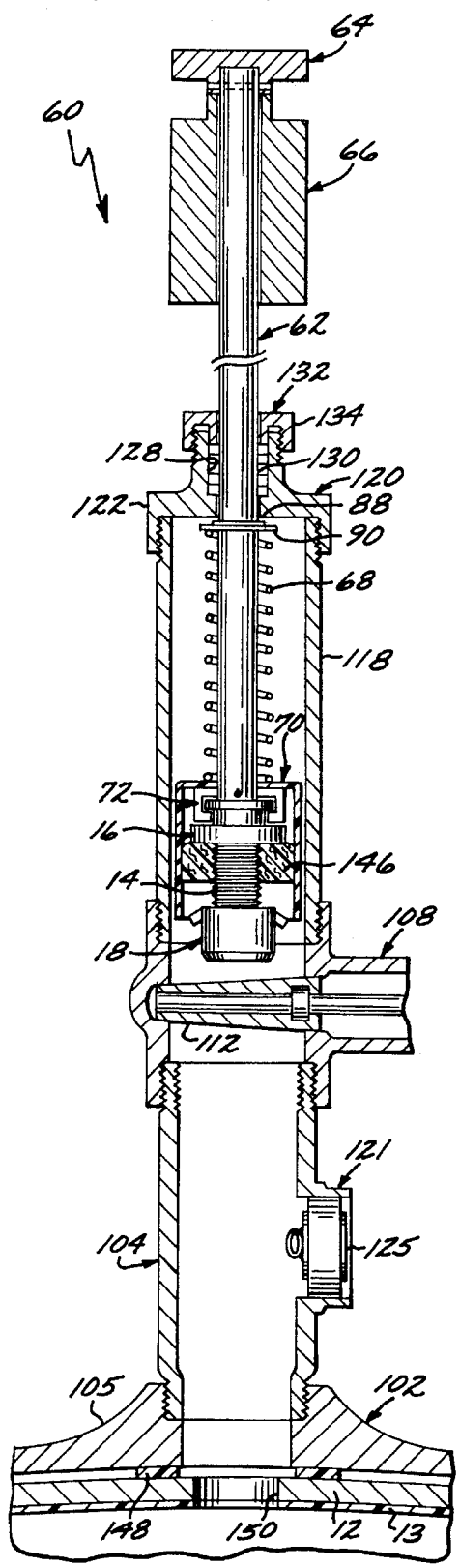
FIG. 11 is a partial sectional side view of the pipeline seal plug and installation tool of the invention in ready position for installing the seal plug.
Figure 18:
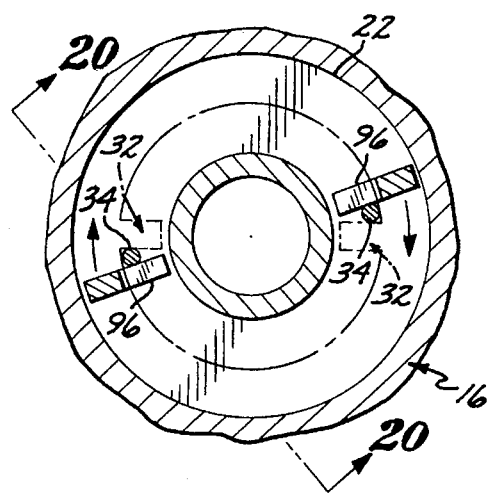
FIG. 18 is a transverse sectional view of the pipeline seal plug and installation tool taken along line 18—18 of FIG. 14, and showing the lateral opposite ends of the drive tang of the installation tool engaged with the seal plug in "tightening" fashion.

As such, the inward projections 96 of the drive tang 72 are aligned below the cap nut slots 32 of the seal plug 10 and the distal end of the tool shaft 62 is received within the top end of the cap nut bore 28 (FIG. 11). To complete engagement of the drive tang to the plug, the workman grasps the seal plug 10 and turns the tool 60 and drive tang clockwise relative to the seal plug so that the inward projections 96 of the drive tang rotate relative to the plug within the circumferential groove 24 of the seal plug. The tool and drive tang are rotated clockwise far enough so that the inward projections of the drive tang abut the drive pins 34 of the seal plug as shown in FIG. 18. The interaction between the foregoing components provides for ease of engagement and disengagement of the seal plug 10 to the installation tool 60. In addition, the tolerances between the foregoing components, allows for little axial travel of the seal plug relative to the tool 60 and drive tang 72 as the bottom surface of the lateral backing member 92 and the upper surface of the cap nut head 26 are in confronting relationship.

With the pipeline seal plug 10 now releasably engaged to the installation tool 60, the tool carrying the seal plug thereon, may be inverted allowing for access to the open cylindrical volume of the adhesive reservoir 70. While holding the tool and reservoir in this position, an adhesive 146 such as a vinyl ester, is introduced into the reservoir, over the bottom end of the lower portion 22 of the cap nut 16 and around the stem 14 of the seal plug. A vinyl ester adhesive, No. 8084, manufactured by Dow Chemical of Midland, Mich. has been found to be appropriate for the sealing of the seal plug relative to the bore hole, and has been found compatible with natural gas. As shown in FIG. 11, the adhesive has sufficient cohesiveness to adhere to the inner reservoir surfaces when the tool 60 is uprighted so that the adhesive does not flow out of the reservoir. It is to be appreciated that a measured volume of adhesive is introduced into the reservoir which allows for a spatial relationship between the dog nut 18 and the adhesive so that the dogs 46 can be pivotally raised about the dog nut 18 and do not become emersed in adhesive (FIG. 12).

With reference now to FIGS. 11 through 21, the operation of the installation tool 60 and installation of the pipeline seal plug 10 can be hereafter described in detail. It should be understood that the service cap 120, gate valve 108, and tee fitting 104 cooperate to define a vertically extending housing H by means of which the installation tool 60 can be employed to position seal plug 10 within a pressurized pipeline. As shown in FIG. 11, with a service cap 120, as described above, disposed over the shaft 68 of the installation tool between the slide handle 66 and the spring retaining ring 88 and the seal plug 10 releasably engaged to the drive tang 72, the pipeline seal plug is in ready position for installation. As such, the spring 68, adhesive reservoir 70 and seal plug 10 may now be introduced into the work bonnet 118. Thereafter, the service cap 120 is threadedly engaged to the top of the work bonnet 118, the packing material 130 of the service cap effectuating a fluid seal between the service cap and the tool shaft 62.

As shown in FIG. 11, the pipeline seal plug 10 is parked above the closed gate valve 108. Thereafter, the workman may open the gate valve 108 releasing equalized pressure from the pipeline into the work bonnet 118. The lock handle 64 is grasped and the installation tool advanced downwardly to carry the seal plug 10 and reservoir 70 through the orifice of the gate valve 108 and tee fitting 104 so that the dog nut 18 of the seal plug is positioned over the bore hole 150.

Figure 12:
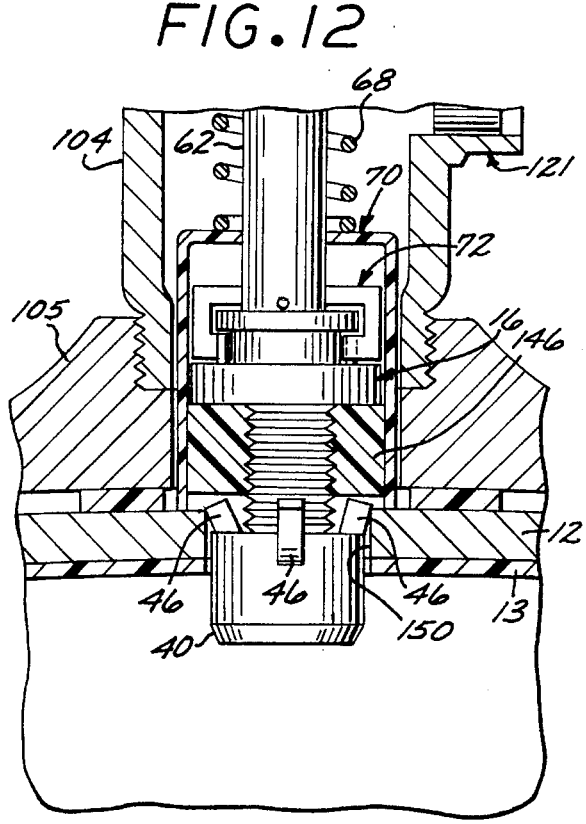
FIG. 12 is an enlarged partial sectional side view of the pipeline seal plug and installation tool showing the seal plug being inserted into the pipeline bore hole.

With reference to FIG. 12, further downward advancement of the installation tool 60 advances the dog nut 18 of the pipeline seal plug 10 through the bore hole 150, the frustoconical downwardly converging taper 40 assisting in alignment of the dog nut within the bore hole. As illustrated, the bottom edges of the respective dogs 46 engage the circumference of the bore hole to pivot the dogs upwardly relative to the dog nut 18. Furthermore, as the seal plug is downwardly advanced through the bore hole, the bottom edge of the reservoir 70 engages the outer surface of the pipeline 12 so that the further downward advancement of the seal plug causes the bottom surface of the cap nut 16 to act as a plunger to displace the adhesive 146 downwardly within the reservoir 70 and toward the bore hole.

Figure 13:
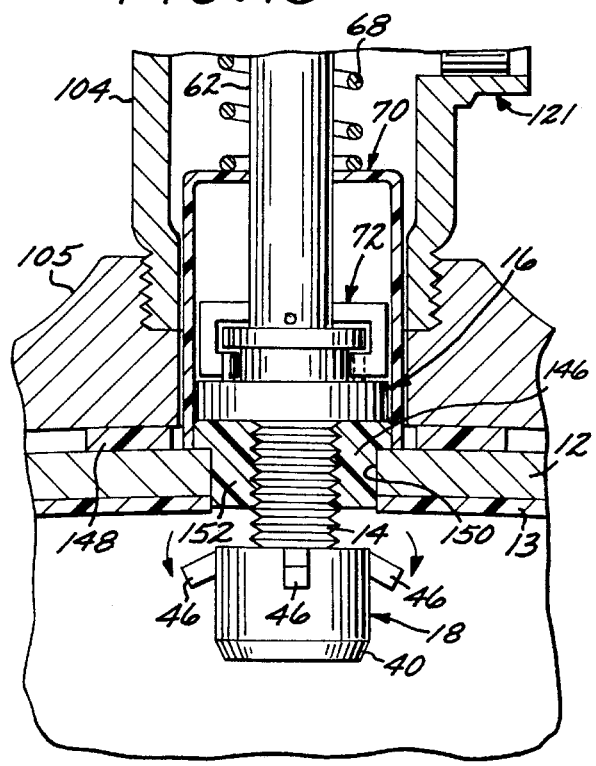
FIG. 13 is a partial sectional side view of the pipeline seal plug and installation tool similar to FIG. 12, but showing a sealant in accordance with the invention being introduced into the open volume between the seal plug and the pipeline bore hole.

As shown in FIG. 13, the installation tool 60 and pipeline seal plug 10 are further advanced downwardly until the bottom surface of the top cap nut 16 of the seal plug is in near engagement with the outer surface of the pipeline 12. As this occurs, the cap nut presses the adhesive 146 through the annular volume defined between the threaded stem 14 of the seal plug and the periphery of bore hole 150. As such, the adhesive uniformly fills the annular volume. In addition, as the dog nut 18 is passed sufficiently below the inner liner 13, the respective dogs 46, under the force of gravity, pivot downwardly and outwardly, the bottom edges thereof engaging the respective abutment surfaces 44 of the dog nut 18 (FIG. 3) to flare outwardly and provide an expansion means. It should by understood that if the seal plug 10 is installed at an angle to the axis of the pipeline, suitable means, such as springs (not shown), may be employed to urge the dogs 46 outwardly, rather than depending upon gravity for the function.

With reference to FIG. 14, to complete the installation of the pipeline seal plug 10, the workman grasps the slide handle 66 at the top end of the installation tool 60 (FIG. 11) and pulls upwardly thereon. As such, the upper surfaces of the respective dogs 46 of the dog nut 18 confront the periphery of the bore hole lining 13, and the top cap 16 of the seal plug generally separates from the adhesive 146. It is to be appreciated that the angled disposition of the respective dogs facilitate axial alignment of the seal plug with respect to the bore hole as the confronting top edges of the dogs communicate with the periphery of the lining 13 around the bore hole 150.

While the workman continues to pull upwardly on the slide handle 66 of the installation tool 60 with enough force to provide sufficient frictional locking force between the dogs 46 of the pipeline seal plug 10 and the lining 13 of the pipeline 12, the workman may grasp the lock handle 64 with his other hand and rotate the lock handle and tool 60 clockwise relative to the slide handle 66. As the workman does so, the shaft 62 of the tool rotates carrying the drive tang 72, the inward members 96 thereof in engagement with the drive pins 34 of the top cap nut 16, as shown in FIGS. 16 and 18. With continued rotation of the lock handle and shaft, the corresponding rotation of the drive tang 72 drives and rotates the top cap nut 16 relative to the dog nut 18 so that the stem 14 is threadedly advanced downwardly into the dog nut. The stem is threadedly advanced into the dog nut until the bottom surface of the top cap nut securely engages the outer surface of the pipeline 12. As such, the lining 13 and pipeline are sandwiched between the dogs 46 and the top cap nut, the dogs providing compressive force against the lining to block any separation of the lining from the pipeline inner wall. Furthermore, as the top cap nut is downwardly advanced relative to the outer surface of the pipeline, the adhesive 146 is further uniformly dispensed into the annular volume between the stem of the seal plug and the bore hole to effectively fill the annular volume.

Figure 19:
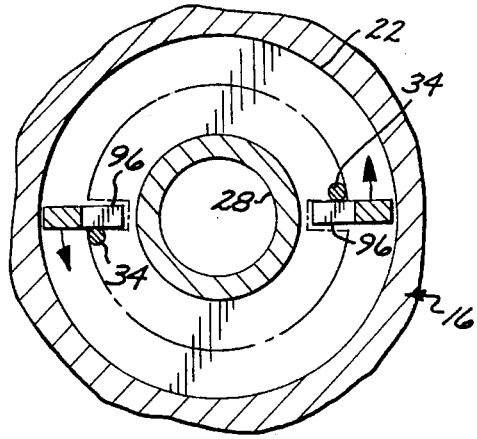
FIG. 19 is a transverse sectional view, similar to FIG. 18, but showing the lateral opposite ends of the drive tang in alignment with slots of the pipeline seal plug.

To disengage the installation tool 60 from the pipeline seal plug 10, the workman gently turns the lock handle 64 counter clockwise. As such, the shaft 62 and the drive tang 72 are rotated therewith, the tang sliding within the circumferential groove 24 of the seal plug 10 until the inward projections 96 thereof gently engage the respective drive pins 24, as shown in FIGS. 17 and 19. When in this position, the respective inward projections of the drive tang are in axial alignment with the slots 32 of the top cap nut head 26. As such, the installation tool and drive tang thereof may be drawn upwardly away from the seal plug.

Similarly, as described above with regard to the withdrawal of the boring apparatus 110 from the gate valve 108 and tee fitting 104, the installation tool 60 and particularly the reservoir 70, drive tang 72, and spring 68 may be withdrawn from within the tee fitting 104 and gate valve 108 and parked within the work bonnet 110. Thereafter, the gate valve may be closed, as shown similarly in FIG. 11, the seal plug 10 however disengaged from the installation tool. The service cap 102 may now be threadedly disengaged from the work bonnet 118, the pressurized fluid therein released and the installation tool removed from the work bonnet.

Figure 21:
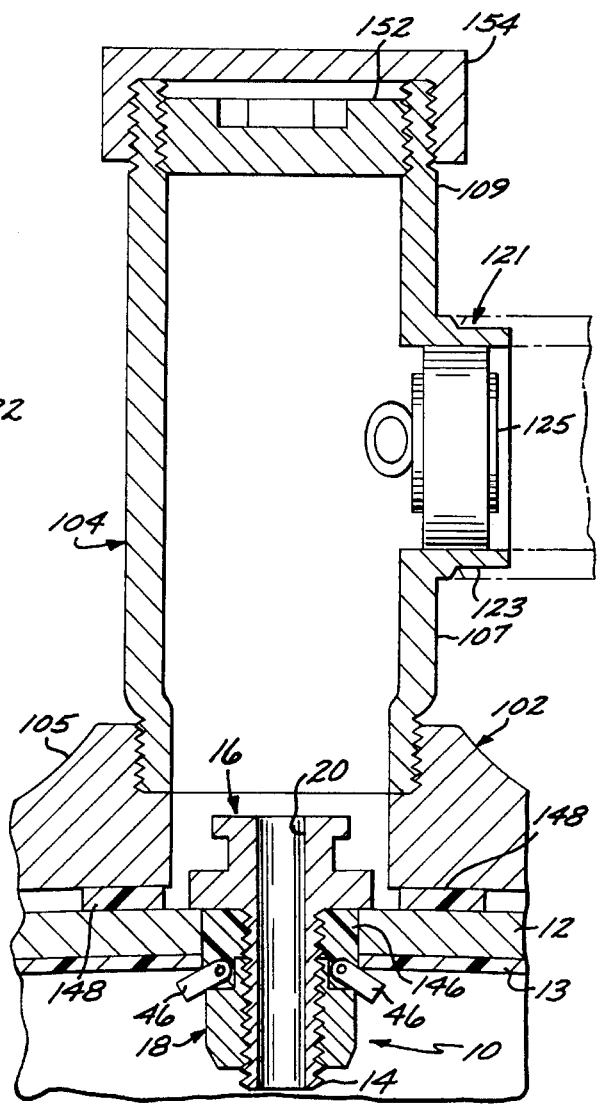
FIG. 21 is a sectional side view of the installed pipeline seal plug.

By following the same procedure described above with regard to the insertion of the boring apparatus and/or the pipeline seal plug into the tee fitting 104, an externally threaded plug 152 may thereafter be threadedly inserted into the upper end 109 of the tee fitting, as shown in FIG. 21. Briefly recanting those steps, a tool having a shaft and a service cap 120 disposed-intermedially thereon with the plug 152 releasably engaged to the distal end thereof would be inserted into the open end of the work bonnet 118 with the gate valve 108 in its closed position. The service cap would thereafter be threadedly engaged to the top end of the work bonnet to prevent leakage of gas past the service cap to atmosphere. The gate valve is opened and the plug and distal end of the tool advanced downwardly through the gate valve. The plug, by rotating the tool, is thereafter threaded into the internal threads of the top end 109 of the tee fitting 104 to effectuate a fluid tight plug. The plug tool and gate valve may then be threadedly disengaged from the gate valve and a protective cap 154 threadedly engaged to the external threads at the top end 109 of the tee fitting 104.

As shown in FIG. 21, the pipeline seal plug 10 is now fully installed in the pipeline 12. The adhesive 146 is allowed to cure, per manufacturers recommended duration, and thereafter the seal plug is ready for in-service use. With a fluid service pipeline (shown in phantom) appropriately welded to the welding neck 123 of the tee fitting 104, the rubber expansion plug 125 may be removed using an appropriate tool and the tee fitting is ready for in-service use.

The foregoing procedure may be repeated at many selected locations along a fluid distribution pipeline. As such, it is to be appreciated that the adhesive reservoir 70, after each or after a few installations, may be removed from the installation tool 60 and appropriately discarried or cleaned of adhesive residues. A clean adhesive reservoir can be disposed on the tool and subsequent seal plug installations may follow.

In addition, it is to be appreciated that the pipeline seal plug components, in particular the seal plug fluid bore dimension and the corresponding tee fittings and the like used to effectuate such pipeline couplings, may be larger or smaller in dimension to accommodate greater or lesser fluid flow rates therethrough. Furthermore, the seal plug components may be dimensionally sized for use with various diameter pipelines and liners.

From the foregoing, it can be appreciated that the pipeline seal plug of the invention provides a device for coupling into a fluid distribution pipeline having a liner disposed therein. More particularly, the seal plug provides for the uniform introduction of an adhesive sealant into the open volume between the seal plug and the bore hole formed in the pipeline and liner to seal the bond line therebetween. The seal plug has the ability for installation into either pressurized or non-pressurized pipelines. In addition, the seal plug is easy to install, reliable in use, and inexpensive to manufacture.

While a particular form of the invention has been illustrated and described, it will be apparent that various modifications can be made without departing from the spirit of the scope of the invention.

I claim:

1. The combination of a seal plug for providing fluid access to a fluid distribution pipeline having an internal liner and formed with a bore hole of a predetermined diameter extending through the pipeline and the liner, and a seal plug installation tool for installing the seal plug on the pipeline:

the seal plug including a body having an enlarged head and an elongated stem extending axially from said head, the head having a diameter greater than the predetermined diameter of the bore hole, the stem having a diameter less than said predetermined diameter, and the stem being formed with a fluid passage extending therethrough, said seal plug also including an anchoring member axially carried by the stem, the anchoring member having an original diameter smaller than the predetermined diameter of the bore hole for insertion through the bore hole into the interior of the pipeline and liner, the anchoring member being radially extendable to a diameter larger than the predetermined diameter of the bore hole; and the seal plug installation tool including a housing formed with connection means releasably engageable with the pipeline in alignment with the bore hole, a shaft carried by the housing, drive means on the shaft releasably engageable with the head of the seal plug body to insert the anchoring member into the interior of the pipeline and liner after which the anchoring member is radially expanded, the seal plug installation tool also including an adhesive reservoir cup carried by the shaft and an adhesive initially disposed within the cup, the seal plug installation tool further having means on the shaft urging the bottom of the cup into engagement with the exterior of the pipeline, the drive means thereafter forcing the head downwardly to press the adhesive into the space in the bore hole between the juncture of the head, the pipeline, the liner, and the anchor member to seal such space, the drive means also effecting relative axial movement of the radially expanded anchoring member on the stem towards the pipeline and liner so that the head and radially expanded anchoring member compressively bear against the pipeline and liner for secure connection of the seal plug with the pipeline and liner.

2. The combination of claim 1 wherein the shaft is axially and rotatably carried by the housing, the elongated stem of the seal plug body is threaded, and the anchoring member is formed with complimentary threads whereby rotation between the stem relative to the anchoring member by the shaft effects axial movement of the seal plug head to press the sealant into said space and to cause the radially expanded anchoring member to be drawn into engagement with the pipeline and liner.

3. The combination of claim 1 wherein the anchoring member is provided with a plurality of pivoted dogs arranged in a retracted position when the anchoring member is inserted through the bore hole, with the dogs pivoting radially outwardly after the anchoring member has been inserted through the bore hole to thereby block retraction of the anchoring member from the bore hole after the dogs engage the pipeline and liner.

4. The combination of claim 1 wherein the shaft is axially and rotatably carried by the housing the elongated stem of the body is threaded and the anchoring member is formed with complimentary threads whereby relative rotation between the stem relative to the anchoring member effects axial movement of the anchoring member on the stem to draw the anchoring member towards the pipeline and liner, and the anchoring member is provided with a plurality of pivoted dogs arranged in a retracted position when the anchoring member is inserted through the bore hole, with the dogs pivoting radially outwardly after the anchoring member has been inserted through the bore hole to engage the pipeline and liner whereby the dogs block retraction of the anchoring member from the bore hole.

5. The combination of claim 1 wherein the adhesive reservoir cup is inverted and slidably carried by the shaft, with the shaft being provided with means that urge the inverted cup into tight engagement with the pipeline while the adhesive is being pressed into said space.

6. The combination of claim 1 wherein the seal plug installation tool is carried by a fitted-sealed housing having its lower end releasably connected to the pipeline, with the shaft extending upwardly through the housing and formed at its upper portion with a handle for effecting movement of the shaft.

7. The combination of claim 2 wherein the adhesive reservoir cup is inverted and slidably carried by the shaft, with the shaft being provided with resilient means that urge the inverted cup into tight engagement with the pipeline while the adhesive is being pressed into said space.

8. The combination of claim 6 wherein the anchoring member is provided with a plurality of pivoted dogs arranged in a retracted position when the anchoring member is inserted through the bore hole, with the dogs pivoting radially outwardly after the anchoring member has been inserted through the bore hole to thereby block retraction of the anchoring member from the bore hole after the dogs engage the pipeline and liner.

9. The combination of claim 6 wherein the adhesive reservoir cup is inverted and slidably carried by the shaft, with the shaft being provided with spring means that urge the inverted cup into tight engagement with the pipeline while the adhesive is being formed into said space.

10. The combination of claim 6 wherein the shaft is axially and rotatably carried by the housing the elongated stem of the body is threaded and the anchoring member is formed with complimentary threads whereby relative rotation between the stem relative to the anchoring member effects axial movement of the anchoring member on the stem to draw the anchoring member towards the pipeline and liner, and the anchoring member is provided with a plurality of pivoted dogs arranged in a retracted position when the anchoring member is inserted through the bore hole, with the dogs pivoting radially outwardly after the anchoring member has been inserted through the bore hole to engage the pipeline and liner whereby the dogs block retraction of the anchoring member from the bore hole.

11. The combination of claim 10 wherein the adhesive reservoir cup is inverted and slidably carried by the shaft, with the shaft having means to urge the cup against the pipeline while the adhesive is being pressed into said space.

12. A method for providing fluid access to a pressurized fluid distribution pipeline having an internal liner, said method comprising;

providing a fluid-tight housing and securing the housing to the pipeline;

forming a bore hole of a predetermined diameter through the pipeline and liner in alignment with the housing;

providing a seal plug having an enlarged head, an elongated stem and an anchoring member axially movably carried by the stem, the anchoring member having an original diameter smaller than the diameter of the bore hole;

positioning the seal plug within the housing;

inserting the anchoring member arranged in its original diameter through the bore hole to the interior of the pipeline and liner;

providing an adhesive-containing reservoir and positioning such reservoir over the bore hole between the seal plug head and the bore hole;

urging the head downwardly to press the adhesive downwardly into the annular volume between the bore hole, the pipeline, the liner, and the seal plug;

radially extending the anchoring member to a diameter larger than the predetermined diameter;

urging the anchoring member towards the liner and pipeline whereby the anchoring member compressively bears against the pipeline and liner around the periphery of the bore hole for secure connection of the seal plug with the pipeline and liner; and disconnecting the housing from the pipeline.

13. A method as set forth in claim 11 wherein the adhesive-containing reservoir is an inverted cup.

14. A seal plug for providing fluid access to a fluid distribution pipeline having an internal liner and formed with a bore hole of a predetermined diameter extending through the pipeline and the liner, said seal plug comprising;

a body having an enlarged head and an elongated threaded stem extending axially from said head, the head having a diameter greater than the predetermined diameter of the bore hole, the stem having a diameter less than said predetermined diameter, and the stem being formed with a fluid passage extending therethrough;

a cylinder of pliable adhesive surrounding the stem below the head; an anchoring member threadably carried by the stem and having a diameter smaller than the predetermined diameter of the bore hole for insertion through the bore hole into the interior of the pipeline and liner;

the anchoring member being provided with a plurality of pivoted dogs arranged in a retracted position when the anchoring member is inserted through the bore hole, with the dogs pivoting radially outwardly after the anchoring member has been inserted through the bore hole to thereby block retraction of the anchoring member from the bore hole after the dogs engage the pipeline and liner;

with such relative rotation effecting axial movement of the head to force the adhesive into the annular volume between the head, the bore hole, the pipeline, the liner, and the upper end of the anchoring member; and with such relative rotation between the stem and anchoring member also effecting axial movement of the anchoring member on the stem to cause the radially expanded anchoring member to be dram into tight engagement with the pipeline and liner after the dogs have been pivoted outwardly.

* * * * *

UNITED STATES PATENT AND TRADEMARK OFFICE
CERTIFICATE OF CORRECTION

PATENT NO. : 5,560,388
DATED : OCTOBER 1, 1996
INVENTOR(S) : THOMAS M. CALDWELL

It is certified that error appears in the above-identified patent and that said Letters Patent is hereby corrected as shown below:

Column 13, line 50, delete "fitted", insert --fluid--.

Signed and Sealed this

Seventh Day of January, 1997

Attest:

BRUCE LEHMAN

Attesting Officer   Commissioner of Patents and Trademarks